US010614344B2

United States Patent
Anthony et al.

(10) Patent No.: US 10,614,344 B2
(45) Date of Patent: *Apr. 7, 2020

(54) SYSTEM AND METHOD OF PREDICTING HUMAN INTERACTION WITH VEHICLES

(71) Applicant: Perceptive Automata, Inc., Somerville, MA (US)

(72) Inventors: Samuel English Anthony, Cambridge, MA (US); Kshitij Misra, Cambridge, MA (US); Avery Wagner Faller, Cambridge, MA (US)

(73) Assignee: Perceptive Automata, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,560

(22) Filed: Jul. 16, 2019

(65) Prior Publication Data

US 2019/0340465 A1 Nov. 7, 2019

Related U.S. Application Data

(63) Continuation of application No. 15/830,549, filed on Dec. 4, 2017.

(Continued)

(51) Int. Cl.
*G06K 9/00* (2006.01)
*G06K 9/62* (2006.01)
(Continued)

(52) U.S. Cl.
CPC ........... *G06K 9/6254* (2013.01); *B60W 30/00* (2013.01); *G05D 1/0088* (2013.01);
(Continued)

(58) Field of Classification Search
CPC ......... G05D 1/0088; G05D 2201/0213; G05D 1/0212; G05D 1/0246; G06N 20/00
(Continued)

(56) References Cited

U.S. PATENT DOCUMENTS 7,269,516 B2 9/2007 Brunner et al.
8,175,333 B2 5/2012 Eaton et al.
(Continued)

OTHER PUBLICATIONS

Girdhar, R. and Ramanan, D., "Attentional Pooling for Action Recognition," 31st Conference on Neural Information Processing Systems (NIPS 2017), 12 pages.
(Continued)

*Primary Examiner* — Charlotte M Baker
(74) *Attorney, Agent, or Firm* — Fenwick & West LLP

(57) ABSTRACT

A computing device receives an image and a video segment of a road scene, the first at least one of an image and a video segment being taken from a perspective of a participant in the road scene and then generates stimulus data based on the image and the video segment. Stimulus data is transmitted to a user interface and response data is received, which includes at least one of an action and a likelihood of the action corresponding to another participant in the road scene. The computing device aggregates a subset of the plurality of response data to form statistical data and a model is created based on the statistical data. The model is applied to another image or video segment and a prediction of user behavior in the another image or video segment is generated.

22 Claims, 11 Drawing Sheets

Related U.S. Application Data

(60) Provisional application No. 62/528,771, filed on Jul. 5, 2017.

(51) Int. Cl.

| | | |
|---|---|---|
| *G06N 3/08* | (2006.01) | |
| *G06N 3/04* | (2006.01) | |
| *G08G 1/16* | (2006.01) | |
| *G08G 1/04* | (2006.01) | |
| *G05D 1/00* | (2006.01) | |
| *B60W 30/00* | (2006.01) | |
| *G06N 5/00* | (2006.01) | |
| *G06N 20/10* | (2019.01) | |

(52) U.S. Cl.
CPC ..... *G06K 9/00335* (2013.01); *G06K 9/00718* (2013.01); *G06K 9/00805* (2013.01); *G06K 9/6256* (2013.01); *G06N 3/04* (2013.01); *G06N 3/08* (2013.01); *G06N 3/084* (2013.01); *G08G 1/04* (2013.01); *G08G 1/166* (2013.01); *G05D 2201/0213* (2013.01); *G06N 5/003* (2013.01); *G06N 20/10* (2019.01)

(58) Field of Classification Search
USPC .......................................................... 382/104
See application file for complete search history.

(56) References Cited

U.S. PATENT DOCUMENTS

| | | | |
|---|---|---|---|
| 8,854,457 | B2 | 10/2014 | De Vleeschouwer et al. |
| 9,881,221 | B2 | 1/2018 | Bala et al. |
| 1,018,612 | A1 | 1/2019 | Kanaujia et al. |
| 2015/0213555 | A1 | 7/2015 | Barfield, Jr. et al. |
| 2017/0153639 | A1 | 6/2017 | Stein |
| 2017/0270374 | A1 | 9/2017 | Myers et al. |
| 2018/0146198 | A1 | 5/2018 | Atluru et al. |
| 2019/0079526 | A1* | 3/2019 | Vallespi-Gonzalez ...................... G05D 1/0221 |

OTHER PUBLICATIONS

He, K., et al. "Mask R-CNN," Computer Vision and Pattern Recognition 1703.06870v3, Jan. 24, 2018, 12 pages.

International Search Report and Written Opinion, PCT Application No. PCT/US2018/063459, dated Feb. 7, 2019, 13 pages.

Karmarkar, T., "Regional Proposal network (RPN)—Backbone of Faster R-CNN," Aug. 18, 2018, 6 pages, [Online][Retrieved Jan. 5, 2019], Retrieved from the internet <URL:https://medium.com/@tanaykarmarkar/region-proposal-network-rpn-bac>.

Kotseruba, I., et al., Joint Attention in Autonomous Driving (JADD), Robotics 1609.04741v5, Apr. 24, 2017, 10 pages.

Newell, A., et al., "Stacked Hourglass Networks for Human Pose Estimation," Computer Vision and Pattern Recognition 1603.06937v2, Jul. 26, 2016, 17 pages.

Ren, S. et al. "Faster R-CNN: Towards Real-Time Object Detection with Region Proposal Networks," Advances in Neural Information Processing Systems 28 (NIPS 2015), 9 pages.

Ren, S. et al. "Faster R-CNN: Towards Real-Time Object Detection with Region Proposal Networks," Computer Vision and Patteren Recognition 1506.01497v3, Jan. 6, 2016, 14 pages.

Santoro, A. et al., "A neural approach to relational reasoning," Jun. 6, 2017, 6 pages, [Online][Retrieved Jan. 5, 2019], Retrieved from the internet <URL:https://deepmind.com/blog/neural-approach-relational-reasoning/>.

Santoro, A. et al., "A simple neural network module for relational reasoning," Computation and Language 1706.01427, Jun. 5, 2017, 16 pages.

Schneemann, F., et al., "Context-based Detection of Pedestrian Crossing Intention for Autonomous Driving in Urban Environments," 2016 IEEE/RSJ International Conference on Intelligent Robots and Systems (IROS), Oct. 2016, 6 pages.

Watters, N., et al., "Visual Interaction Networks," Computer Vision and Pattern Recognition 1706.01433v1, Jun. 5, 2017, 14 pages.

Zhao, H., et al., "Pyramid Scheme Parsing Network," Computer Vision and Pattern Recognition 1612.01105v2, Apr. 27, 2017, 11 pages.

\* cited by examiner

| 600 | 602 | 604 | 606 |
|---|---|---|---|
| subject_id | derived_stim | response | response_time |
| 2329 | /ims/seg114/vid44m22s23-28 | 3 | 440 |
| 2329 | /ims/seg3932/vid329m24s01-16 | 1 | 600 |
| 2330 | /ims/seg114/vid44m22s23-28 | 1 | 280 |
| 2330 | /ims/seg118/vid51m02s44-50 | 4 | 500 |

FIG. 6

SYSTEM AND METHOD OF PREDICTING HUMAN INTERACTION WITH VEHICLES

CROSS REFERENCE TO RELATED APPLICATIONS

This application is a continuation of U.S. patent application Ser. No. 15/830,549, filed on Dec. 4, 2017, which claims priority under 35 U.S.C. § 119(e) to U.S. Provisional Application No. 62/528,771, filed Jul. 5, 2017, the contents of each of which are incorporated by reference herein.

TECHNICAL FIELD

The present disclosure relates generally to data analytics, and in particular, to predicting human interaction with vehicles.

BACKGROUND

The ability a driver of a car to look at a person—who is walking, driving another car, or riding a bike on or near a street—and predict what that person wants to do may be the single most important part of urban driving. For example, when a driver of a car sees people near the car, determining whether one person will cross the street, whether another person will remain standing on a street corner, and whether yet another person will change lanes on his or her bicycle is necessary to safely drive the car and avoid hitting the people. This ability is so fundamental, that operating in cities without it would be nearly impossible.

Fortunately, human drivers have such a natural ability to predict a person's behavior. In fact, they can do it so effortlessly, that they often do not even notice that they are doing it. However, computers and autonomous driving vehicles cannot adequately predict the behavior of people, especially in urban environments.

For example, autonomous driving vehicles may rely on methods that make decisions on how to control the vehicles by predicting "motion vectors" of people near the vehicles. This is accomplished by collecting data of a person's current and past movements, determining a motion vector of the person at a current time based on these movements, and extrapolating a future motion vector representing the person's predicted motion at a future time based on the current motion vector. However, the methods do not predict a person's actions or movements based on other observations besides his or her current and past movements, which lead to inferior results in predicting the person's future behavior.

SUMMARY OF THE INVENTION

Systems and methods for predicting user interaction with vehicles enabling motorists, cyclists, and pedestrians to anticipate the actions of other motorists, cyclists, and pedestrians. In some embodiments, a computing device receives a first at least one of an image and a video segment of a road scene, the first at least one of an image and a video segment being taken from a perspective of a participant in the road scene, the first at least one of an image and a video segment including at least one of a pedestrian, a cyclist, and a motor vehicle. In some embodiments, the computing device generates stimulus data based on the first at least one of the image and the video segment, the stimulus data comprising at least one of the first at least one of the image and the video segment, and an altered version of the first at least one of the image and the video segment. In some embodiments, the computing device transmits the stimulus data to a user interface. In some embodiments, the computing device receives a plurality of response data from the user interface, the response data including user inputted data by associated with the stimulus data, the user inputted data including at least one of an action and a likelihood of the action corresponding to at least one of the pedestrian, the cyclist, and the motor vehicle associated with the road scene. In some embodiments, the computing device aggregates a subset of the plurality of response data corresponding to one of the first at least one of the image and the video segment to form statistical data. In some embodiments, the computing device creates a model based on the statistical data and applies the model to a second at least one image or video segment. In some embodiments, the computing device generates a prediction of user behavior in the second at least one image or video segment based on the application of the model to the second at least one image or video segment.

In some embodiments, creating the model further comprises training a supervised learning algorithm, the supervised learning algorithm including at least one of a random forest regressor, a support vector regressor, a simple neural network, a deep convolutional neural network, a recurrent neural network, and a long-short-term memory (LSTM) neural network. In some embodiments, generating the stimulus data further comprises manipulating at least one of pixel data or array data associated with the first at least one of the image and the video segment and creating a manipulated data file including the manipulated at least one of pixel data or array data associated with the first at least one of the image and the video segment. In some embodiments, the manipulated data file includes a looped version of extracted frames from the first at least one of the image and the video segment. In some embodiments, the action includes one of the at least one of the pedestrian, the cyclist, and the motor vehicle staying in place, changing lanes, and crossing a street, and the likelihood of the action includes an ordinal value associated with a probability of the action. In some embodiments, the statistical data is associated with a parameter of the subset of the plurality of response data, the parameter including at least one of a content of a response, a time associated with entering a response, and a position of an eye of a human observer associated with the response, the position being measured with respect to a display associated with the user interface. The parameter is further associated with at least one of a central tendency, a variance, a skew, a kurtosis, a scale, and a histogram. In some embodiments, the second at least one image or video segment is associated with a live road scene. In some embodiments, the computing device further comprises receiving the second at least one image or video segment from another computing device associated with a vehicle participating in the live road scene. In some embodiments, the second at least one image or video segment is the same as the first at least one image or video segment and the computing device further compares the prediction of user behavior with the statistical data to generate an error signal and adjusts at least one weight associated with the model based on the error signal.

These and other capabilities of the disclosed subject matter will be more fully understood after a review of the following figures, detailed description, and claims. It is to be understood that the phraseology and terminology employed herein are for the purpose of setting forth illustrative examples of the invention, and the description should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 6 shows a data structure associated with tracking video frame data, according to some embodiments of the present disclosure.

DETAILED DESCRIPTION

Systems and methods are described for judging the behavior of people near a vehicle in a way that more closely resembles how human drivers would judge the behavior. For example, in one embodiment, a group of users (or human observers) view sample images of people (such as pedestrians) near streets and/or vehicles and indicate or are measured for their understanding of how they believe the people will behave. These indicators or measurements are then used as a component for training an algorithm that predicts how people will behave in a real-world context. In other words, after being trained based on the reactions of human observers to sample images in a training environment, the algorithm is able predict actual pedestrian behavior in a real-world environment.

In a further implementation, human observers are presented with small samples of video data that have been modified to focus the observers on aspects of the samples most likely to be relevant to predicting pedestrian or other driver behavior, and to eliminate aspects which are not relevant to prediction such behavior. Large sets of observers are asked to score the samples of video data on a continuum, and the scored samples are collected. The overall collection of scores on the continuum comprises a distribution of "scores." The parameters of this distribution are then used to construct a target for the learning model of an algorithm for subsequently predicting pedestrian or driver behavior in a real-world environment.

Figure 1:
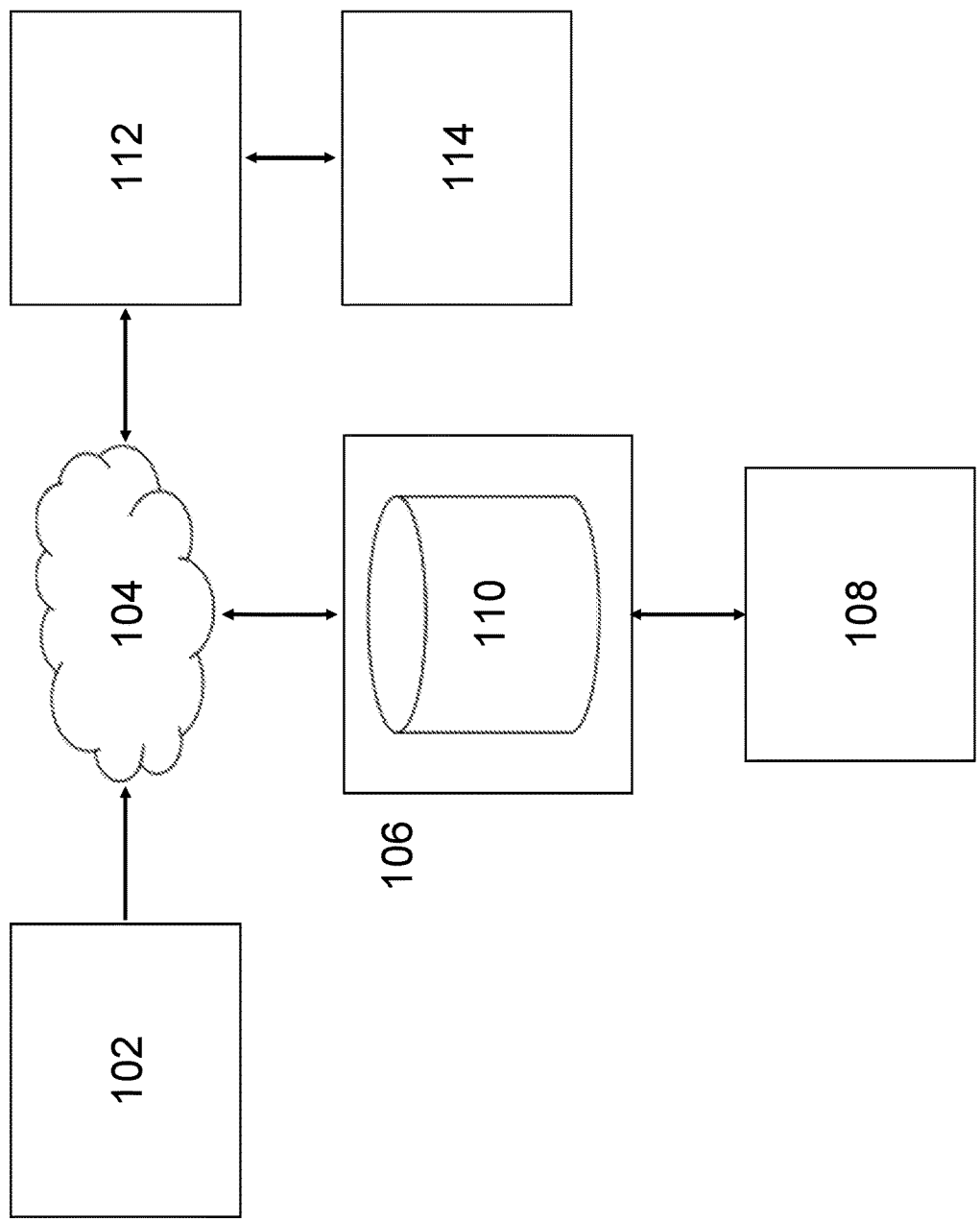
FIG. 1 is a system diagram of a networked system for predicting human behavior according to some embodiments of the present disclosure.

FIG. 1 is a system diagram of a networked system for predicting human behavior according to some embodiments of the present disclosure. FIG. 1 shows a vehicle 102, a network 104, a server 106, a user response database 110, a user terminal 108, a model training system 112 and a prediction engine 114.

The vehicle 102 can be any type of manual or motorized vehicle such as a car, bus, train, scooter, or bicycle. As described in more detail below, the vehicle 102 can include sensors for monitoring the environment surrounding the vehicle. In one implementation, the sensors can include a camera affixed to any portion of the vehicle for capturing a video of people near the vehicle.

The network 104 can be any wired and/or wireless network capable of receiving sensor data collected by the vehicle 102 and distributing it to the server 106, the model training system 112, and, through the model training system 112, the prediction engine 114.

The server 106 can be any type of computer system capable of (1) hosting information (such as image, video and text information) and delivering it to a user terminal (such as user terminal 108), (2) recording responses of multiple users (or human observers) to the information, and (3) delivering such information and accompanying responses (such as responses input via user terminal 108) back to the network 104.

The user response database 110 can be any type of database or data storage system capable of storing the image, video, and text information and associated user responses and subsequently recalling them in response to a query.

The model training system 112 can be implemented in any type of computing system. In one embodiment, the system 112 receives the image, video, and/or text information and accompanying, or linked, user responses from the database 110 over the network 104. In some embodiments, the text segments are discrete values or free text responses. The model training system 112 can use images, video segments and text segments as training examples to train an algorithm, and can create labels from the accompanying user responses based on the trained algorithm. These labels indicate how the algorithm predicts the behavior of the people in the associated image, video, and/or text segments. After the labels are created, the model training system 112 can transmit them to the prediction engine 144.

The prediction engine 114 can be implemented in any computing system. In an illustrative example, the engine 114 includes an algorithm that has been trained by the model training system 112. This trained algorithm is able to estimate a label for a new (e.g., an actual "real-world") image, video, and/or text segment based on the labels and associated image, video, and/or text segments that it received from the model training system 112. In some embodiments, this label comprises aggregate or summary information about the responses of a large number of users (or human observers) presented with similar image, video, or text segments while the algorithm was being trained.

Figure 2A:
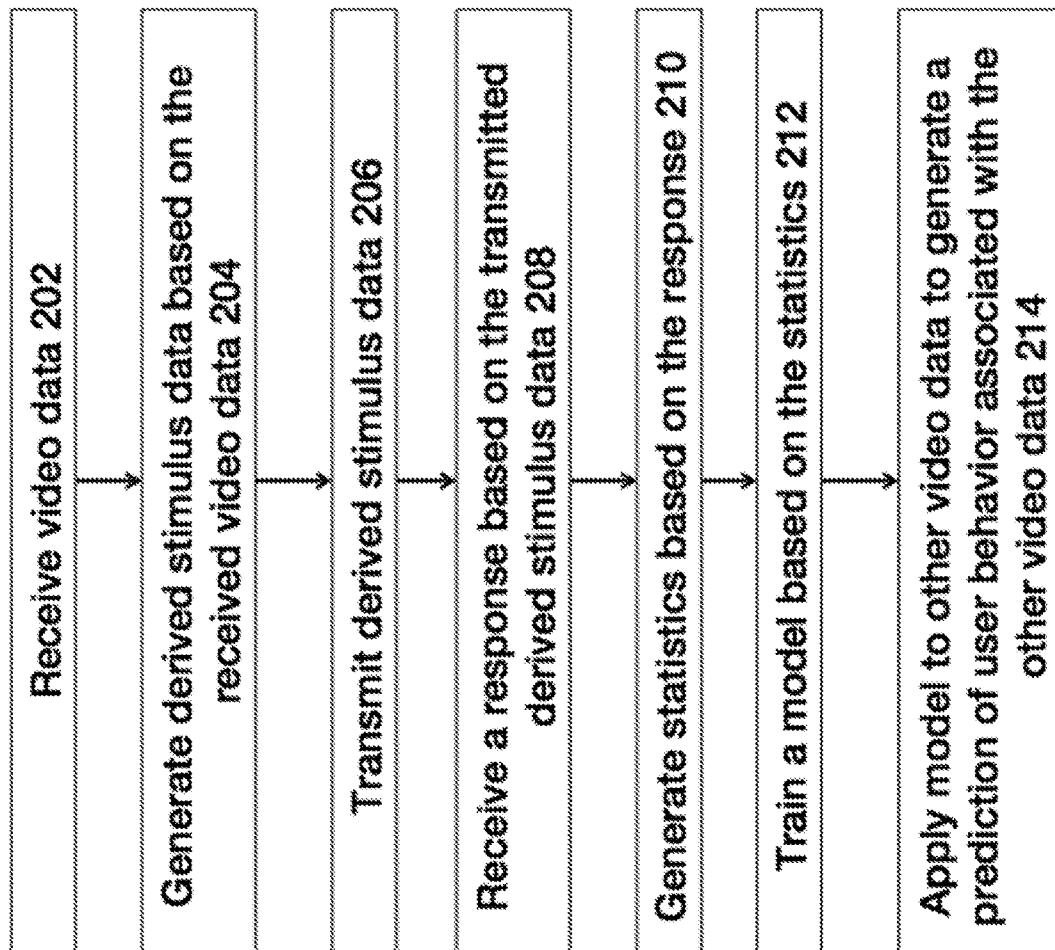
FIG. 2A is a flow chart showing a process of predicting human behavior, according to some embodiments of the present disclosure.

FIG. 2A is a flow chart showing a process of predicting human behavior, according to some embodiments of the present disclosure. In one implementation, video or other data is captured by a camera or sensor mounted on the vehicle 102. The camera or other sensor can be mounted in a fixed or temporary manner to the vehicle 102. Of course, the camera does not need to be mounted to an automobile, and could be mounted to another type of vehicle, such as a bicycle. As the vehicle travels along various streets, the camera or sensor captures still and/or moving images (or other sensor data) of pedestrians, bicycles, automobiles, etc. moving or being stationary on or near the streets. In step 202, this video or other data captured by the camera or other sensor is transmitted from the vehicle 102, over the network 104, and to the server 106 where it is stored.

Then, in step 204, video frames or segments are extracted from the stored video or other data and are used to create stimulus data including derived stimulus (or stimuli). In one implementation, the derived stimulus corresponds to a scene in which one or more humans are conducting activities (e.g., standing, walking, driving, riding a bicycle, etc.) beside or on a street and/or near a vehicle. As explained in more detail below for example in step 214 and in the text accompanying FIG. 9, as part of the training process for the prediction algorithm, human observers view the derived stimulus and predict how they believe the humans shown in the derived stimulus will act. In yet a further implementation, after the video frames or segments are extracted from the stored data, the derived stimulus is generated by manipulating the pixels or equivalent array data acquired from the camera or other sensor in step 204, producing a new data file that conveys a portion of the information from the original video with certain aspects highlighted or obscured, as described below in FIG. 4.

Figure 2B:
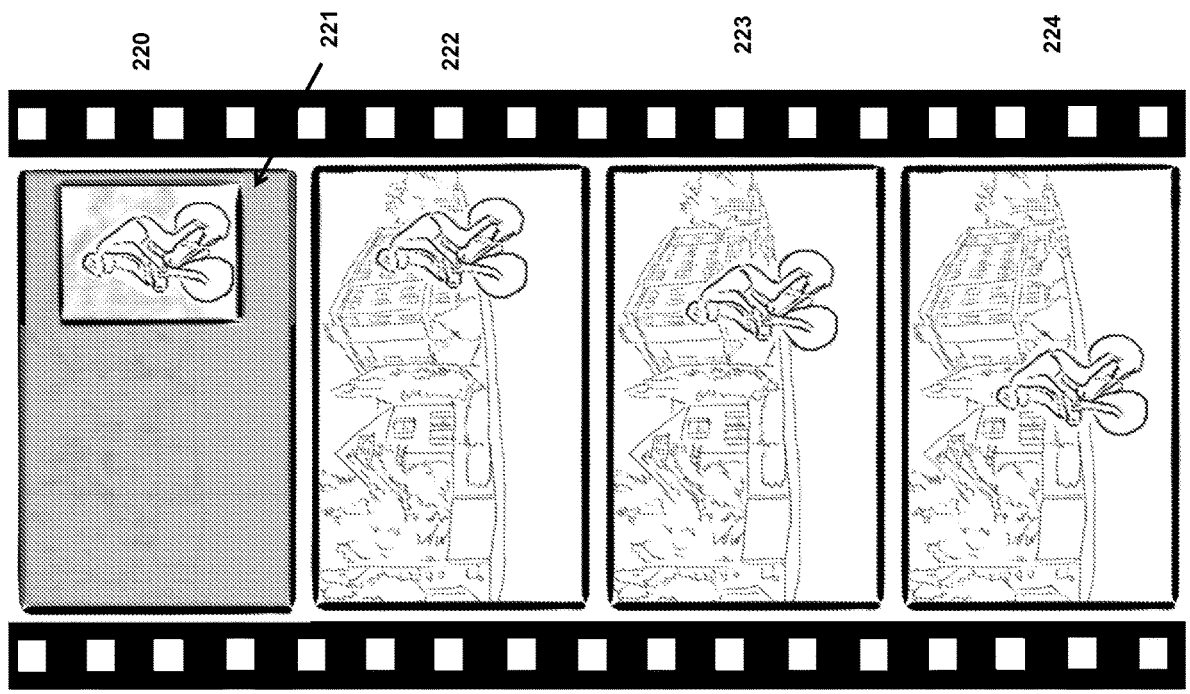
FIG. 2B shows an example of a derived stimulus, according to some embodiments of the present disclosure.

FIG. 2B shows an example of a derived stimulus, according to some embodiments of the present disclosure. As shown, three non-consecutive frames 220, 222, 223, and 224, are extracted from a short segment of video. A copy of the first frame is made 220. On the copy of the first frame 220, a box 221 is drawn around the figure of interest, highlighting that figure. The copy of the first frame 220 and the three extracted frames 222, 223, and 224 are then recombined into a short video segment that loops. This encourages human observers to focus on a figure of interest in the video segment.

In step 206, the derived stimulus is transmitted from the server 106 and displayed to a large number of users (or human observers) on the user terminal 108 (or multiple terminals 108). The terminal(s) 108 prompt the human observers to predict how the people shown in the derived stimulus will act, and upon viewing the displayed stimulus, the observers input their responses corresponding to their predictions. For example, in the derived stimulus shown in FIG. 2B, the human observers may predict that the bicyclist will continue riding to the left in the figure. In other derived stimuli, the responses may predict whether a first person in the stimulus will cross the street, another person will remain standing on a street corner, and yet another person will change lanes on his or her bicycle. In an illustrative embodiment, the human observers may make a continuous or ordinal judgment about the state of mind or the predicted behavior of the people shown in the derived stimulus and record that judgment. For example, the human observers may select an appropriate icon displayed on the terminal(s) 108 by clicking a mouse or by pressing a key to indicate their judgment or prediction. The judgment or prediction may correspond to the human observers' assessment of the state of mind of the person in the derived stimulus or other awareness or intention that would be relevant to a hypothetical driver who sees the person in the derived stimulus while driving. In step 208, the derived stimulus and associated human observer responses are transmitted from the terminal(s) 108 to the server 106 and recorded in the user response database 110.

In step 210, summary statistics are generated based on the user responses. For example, the statistics may characterize the aggregate responses of multiple human observers to a particular derived stimulus. For instance, if the derived stimulus shows a pedestrian walking on a sidewalk towards an intersection, the response can be categorized in terms of how many human observers believe that the pedestrian will stop upon reaching the intersection, continue walking straight across the intersection, turn a corner and continue walking along the sidewalk without crossing the intersection, etc. These summary statistics can characterize the human observer responses in terms of certain parameters associated with the statistics, such as a content of a response, a time associated with entering a response, and a position of an eye of a human observer associated with the response. The parameters can also be associated with a (1) central tendency, variance, skew, kurtosis, scale, or histogram. For example, the amount of time users took to input their responses can be characterized in terms of central tendency, variance, skew, kurtosis, scale, histogram. Also, the statistics can include a parameter that additionally or alternatively characterizes the movement of the human observers' eyes relative to a display when making the judgments in terms of central tendency, variance, skew, kurtosis, scale, histogram or two-dimensional distribution. In one embodiment, the statistics are stored in the user response database 110 with an index that identifies the raw video or sensor data from which the derived stimulus was generated. In a further embodiment, the statistics stored in the database 110 cover a large set of images of people on or near roads and are categorized in a number of different categories, such as pedestrian, driver, motorcyclist, bicyclist, scooter driver, self-balancing scooter rider, unicyclist, motorized wheelchair user, skateboarder, or others. Moreover, the statistics are respectively stored along with, or linked to, the images of the derived stimuli corresponding to the statistics.

In step 212, the stored statistics and corresponding images (e.g., the video frames or segments that were extracted from the video or other data (captured from the camera or sensor of the vehicle 202)) are sent over the network 104 to the model training system 112 and used to train a prediction algorithm. For example, the collection of images and statistics can be used to train a supervised learning algorithm, which can comprise a random forest regressor, a support vector regressor, a simple neural network, a deep convolutional neural network, a recurrent neural network, a long-short-term memory (LSTM) neural network with linear or nonlinear kernels that are two dimensional or three dimensional, or any other supervised learning algorithm which is able to take a collection of data labeled with continuous values and adapt its architecture in terms of weights, structure or other characteristics to minimize the deviation between its predicted label on a novel stimulus and the actual label collected on that stimulus using the same method as was used on the set of stimuli used to train that network. The model is given data which comprises some subset of the pixel data from the video frames that the summary statistics were generated from. In one implementation, this subset includes the pixel data contained in a box (such as the box 221 shown in FIG. 2B) drawn to contain the boundaries of the person, cyclist, motorist and vehicle, or other road user, including their mode of conveyance. In some other implementations, it also includes the entire pixel data from the rest of the image. In one of those implementations, that pixel data is selected according to criteria such as the salience of those features in terms of contrast, lighting, presence of edges, or color. In an additional implementation, the features can include descriptive meta-data about the images such as the dimensions and location of the bounding box, the shape of the bounding box or the change in size or position of the bounding box from one frame to the next.

In step 214, the prediction engine 114 uses the trained model from the model training system 112 to predict the actual, "real-world" or "live data" behavior of people on or near a road. In one embodiment, the prediction engine 114 receives "live data" that matches the format of the data used to train the trained model. For example, if the trained model was trained based on video data received from a camera on the vehicle 102, the "live data" that is input to the algorithm likewise is video data from the same or similar type camera. On the other hand, if the model was trained based on another type of sensor data received from another type of sensor on the vehicle 102, the "live data" that is input to the prediction engine 114 likewise is the other type of data from the same or similar sensor.

The trained model or algorithm makes a prediction of what a pedestrian or other person shown in the "live data" would do based on the summary statistics and/or training labels of one or more derived stimulus. The accuracy of the model is determined by having it make predictions of novel derived stimuli that were not part of the training images previously mentioned but which do have human ratings attached to them, such that the summary statistics on the novel images can be generated using the same method as was used to generate the summary statistics for the training data, but where the correlation between summary statistics and image data was not part of the model training process. The predictions produced by the trained model comprise a set of predictions of the state of mind of road users that can then be used to improve the performance of autonomous vehicles, robots, virtual agents, trucks, bicycles, or other systems that operate on roadways by allowing them to make judgments about the future behavior of road users based on their state of mind.

Figure 3:
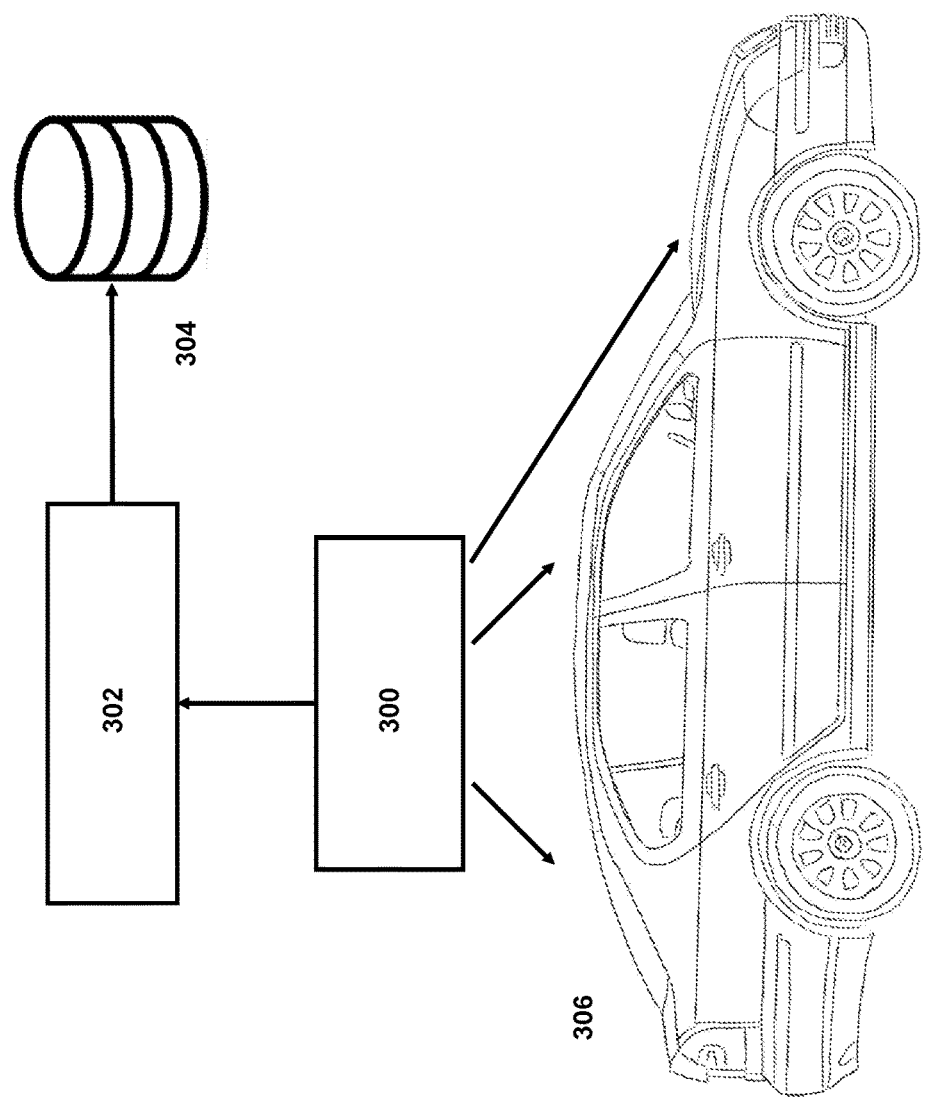
FIG. 3 is a system diagram showing a sensor system associated with a vehicle, according to some embodiments of the present disclosure.

FIG. 3 is a system diagram showing a sensor system associated with a vehicle, according to some embodiments of the present disclosure. FIG. 3 shows a vehicle 306 with arrows pointing to the locations of its sensors 300, a local processor and storage 302, and remote storage 304.

Data is collected from cameras or other sensors 300 including solid state Lidar, rotating Lidar, medium range radar, or others mounted on the car in either a fixed or temporary capacity and oriented such that they capture images of the road ahead, behind, and/or to the side of the car. In some embodiments, the sensor data is recorded on a physical storage medium (not shown) such as a compact flash drive, hard drive, solid state drive or dedicated data logger. In some embodiments, the sensors 300 and storage media are managed by the processor 302.

The sensor data can be transferred from the in-car data storage medium and processor 302 to another storage medium 304 which could include cloud-based, desktop, or hosted server storage products. In some embodiments, the sensor data can be stored as video, video segments, or video frames.

In some embodiments, data in the remote storage 304 also includes database tables associated with the sensor data. When sensor data is received, a row can be added to a database table that records information about the sensor data that was recorded, including where it was recorded, by whom, on what date, how long the segment is, where the physical files can be found either on the internet or on local storage, what the resolution of the sensor data is, what type of sensor it was recorded on, the position of the sensor, and other characteristics.

Figure 4:
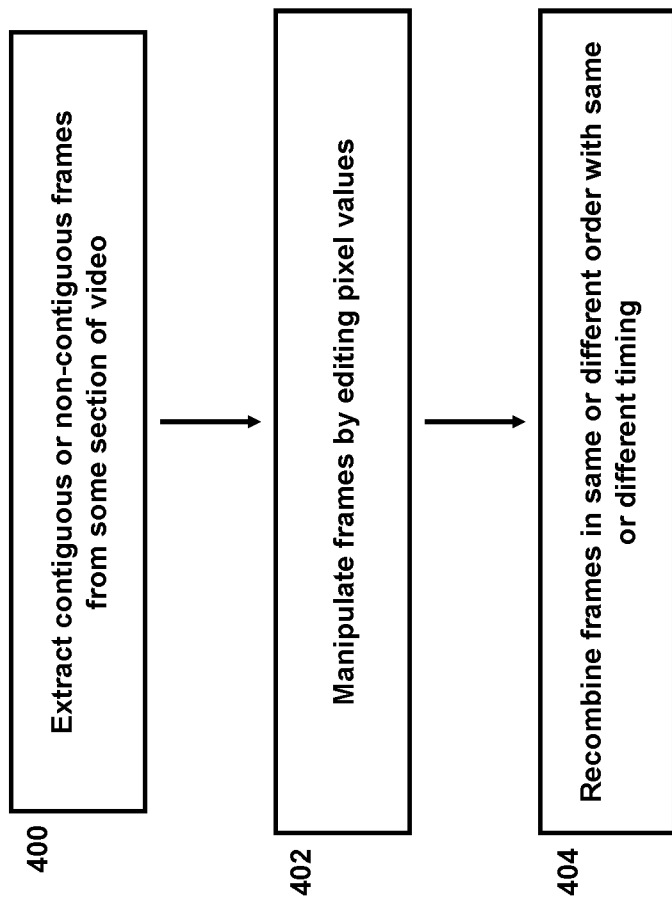
FIG. 4 shows a process of generating derived stimuli from raw camera or sensor data in the vehicle, according to some embodiments of the present disclosure.

FIG. 4 shows a process of generating derived stimuli from raw camera or sensor data in the vehicle, according to some embodiments of the present disclosure.

Referring to step 400, video or data frames are selected according to a method which selects either random or specific frames from video or sensor data segments. As described above, sensor data can include video segments or specific frames. These frames can either be contiguous or non-contiguous, and can be in the original order, in a permuted order, in reverse order, or in random order. Some of the frames can be repeated once or more than once. The frames are selected so that when human observers are later presented with reordered versions of the sequences of frames, they perceive either the actual motion of humans in the scene that was captured in the original video, or motion that is a product of the ordering of the frames but which diverges via reordering from the motion that was originally captured. The temporal information that the human observers looking at the sets of images or derived stimulus are able to use to answer questions about the sets of images may be therefore limited or expanded to include specific temporal cues that were or were not in the original sequence.

Referring to step 402, some of the frames can be manipulated. The frames can be manipulated by adjusting pixel values. These manipulations can include blurring, the addition or one or more occluding bars, bands, or shapes, sharpening, the removal of color information, the manipulation of color information, the drawing of non-occluding or highlighting shapes on the image, other manipulations, or a combination of the manipulations listed here, or a combination of the manipulations listed here with other manipulations, or other manipulations of the pixels not listed combined with each other. The manipulations serve the purpose of highlighting, occluding or degrading portions of the image, so that when the images are shown to the human observers, they are directed to people or specific portions of the image when predicting what the people in the images will do. For example, using the highlighting described above, a certain pedestrian in a scene can be isolated such that a human observer's feedback can be more reliably associated with the pedestrian.

Referring to step 404, frames can be recombined to form a derived stimulus. In some embodiments, if there is only one frame that frame comprises the derived stimulus. If there is more than one frame those frames may then be recombined. The recombination into a temporal segment can involve the frames having the same display time and interval as in the original video clip or could involve faster, slower or variable display times. The timing of the recombination is chosen in order to shape the perceived temporal duration of the activities visible in the original video segment so the judgments the observers make will rely on temporal information that is or is not identical to that featured in the original image.

Figure 5:
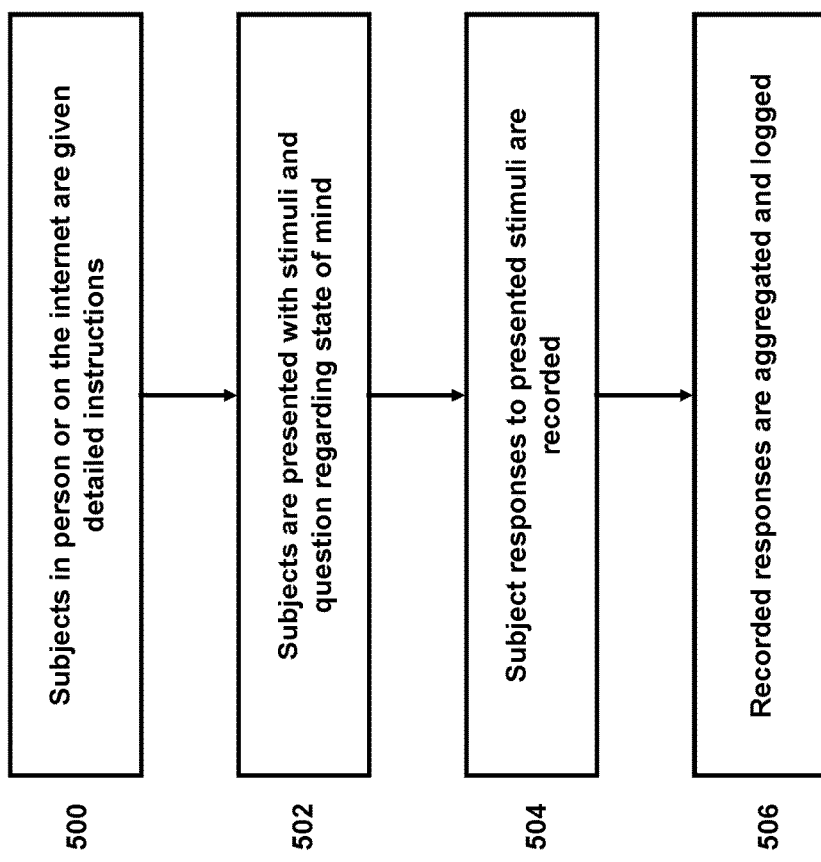
FIG. 5 is a flowchart showing a process of collecting predictions and other information from human observers based on derived stimuli, according to some embodiments of the present disclosure.

FIG. 5 is a flowchart showing a process of collecting predictions and other information from human observers based on derived stimuli, according to some embodiments of the present disclosure. In step 500, human observers are given detailed instructions about how to answer questions about derived stimuli. In step 502, those observers are presented with derived stimuli and asked to answer questions about them. In step 504, the observers respond to the stimuli and those responses are recorded. In step 506, the recorded responses are aggregated and logged in a database.

For example, the responses may be sent to and logged in the user response database 110 (FIG. 1).

Referring to step 500, in one example, some number of human observers (two or more) are recruited to participate on one or several crowdsourcing websites, such as Amazon's Mechanical Turk or at a physical location provided with a display. The observers are given detailed written and pictorial instructions explaining the task that they are about to complete. These instructions give examples of situations that might be depicted in the derived stimuli, and the kinds of responses that would be appropriate for those situations. For example, if human observers are asked to judge the intention of a pedestrian to walk in front of a car, the instructions may be: "In this test, we want you to pretend you're driving a car. You'll see road scenes with cyclists highlighted, and you'll have to decide what they're planning to do. Try to answer as quickly as you can. If a box contains more than one cyclist, try to judge if any of them intends to ride into the path of your car. Some of the images might be small, or dark, but just do your best."

Referring to step 502, the human observers may be shown a display which includes the derived stimulus. The display also includes a mechanism for making a judgment about the stimulus. The mechanism for making the judgment can be a continuous indicator such as a ribbon on which the observer could drag a control to a certain point. The mechanism can also be an ordinal measure such as a Likert scale where the observer can make a judgment about a degree of certainty of the judgment. The mechanism can also be a control that the human observer drags with their mouse to draw a trajectory onscreen indicating a judgment. The mechanism can also be a text entry field where the observer types a description of their judgment. The judgment that the human observer makes is an evaluation of the state of mind of a road user depicted in the derived stimulus. The evaluation can be of the intention, awareness, personality, state of consciousness, level of tiredness, aggressiveness, enthusiasm, thoughtfulness or another characteristic of the internal mental state of the pictured road user. If the ratings collected are on an ordinal scale they can describe the characteristic using language of probability, such as "the other driver may be attentive" or "the other driver" is definitely attentive" or "the other driver is definitely not attentive". The ratings of large numbers of human observers are collected. Summary statistics are generated based on the responses of all of the observers who looked at an image. Individual variability in responses to a given stimulus can be characterized in the information given by the observers to the learning algorithm. The summary statistics might include unweighted information from all observers, or might exclude observers based on extrinsic or intrinsic criteria such as the time it took an observer to respond, the geographical location of an observer, the observer's self-reported driving experience, or the observer's reliability in making ratings of a set of other images.

Referring to step 504, the explicit response of the observer is recorded as well as implicit data. The implicit data can include how long the subject took to respond, if they hesitated in their motions, if they deleted keystrokes, if they moved the mouse anywhere other than the location corresponding to the response they eventually chose, where their eyes moved, or other implicit measures.

Referring to step 506, the responses are aggregated and recorded in a data structure, such as the user response database 110 (FIG. 1). This data structure is then sent as a text field to a networked computer system running database software and logged in a database.

FIG. 6 shows a data structure (e.g., table) associated with tracking video frame data according to some embodiments of the present disclosure. Column 600 shows an example of a unique identifier for each human observer who rated an image. Column 602 shows a unique identifier for a given derived stimulus. Column 604 shows an example of a response from an observer recorded in the database. Column 606 shows an example of additional information—in this case response time—recorded by the database.

In reference to column 600, each observer who is shown the stimuli is given a unique identifier so that information about their response may be analyzed in the context of their responses to other images.

In reference to column 602, each derived stimulus that is rated by a human observer is listed with a filename and path that uniquely identifies that derived stimulus, and also indicates the original video frames from which that derived stimulus was generated.

In reference to column 604, for each stimulus rated by each human observer, a response is recorded that could be a continuous, discrete, or ordinal value. This value may refer to the probability of the pictured human road user has a given state of mind—e.g. that a pedestrian is likely to cross the street or that an oncoming vehicle is unlikely to be willing to yield to the vehicle containing the sensor if the vehicle containing the sensor needs to turn. In some embodiments, a higher ordinal value (e.g., the ordinal 4 as shown in FIG. 6) indicates that a human observer believes that there is a higher probability that the pictured human road user has a given state of mind or will perform a particular action. On the other hand, a lower ordinal value (e.g., the ordinal 1 as shown in FIG. 6) indicates that the human observer believes that there is a lower probability that the pictured human road user has the state of mind or will perform the particular action. On the other hand, in some embodiments, a lower ordinal value can indicate a higher probability of an action, and a higher ordinal value can indicate a lower probability of an action.

In reference to column 606, an amount of time associated with a subject responding to the derived stimulus is also recorded. In some embodiments, this time is associated with the overall reliability of the human observer's rating. For example, a response associated with a lower response time may be weighted higher and a response associated with a slower response time may be weighted lower.

Figure 7:
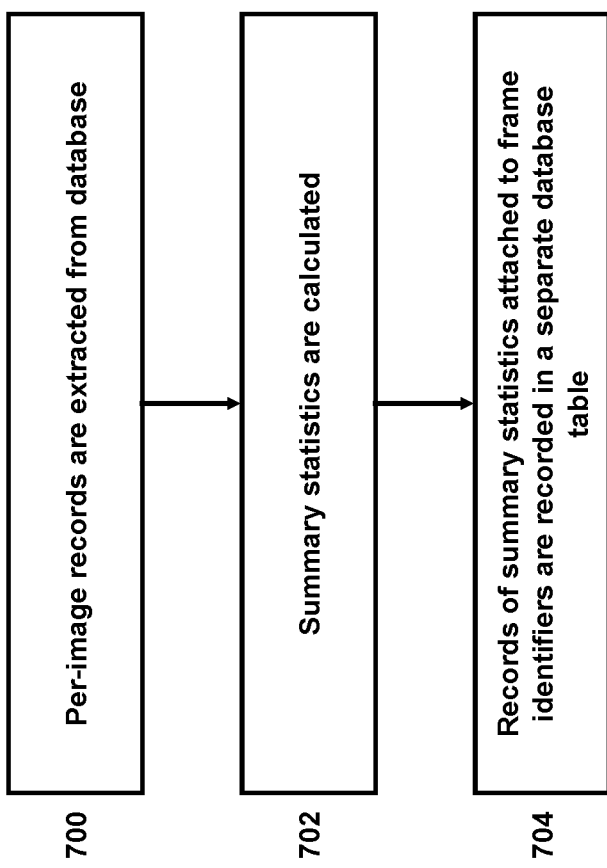
FIG. 7 is a flowchart showing a process for producing summary statistics of a video frame or derived stimulus according to some embodiments of the present disclosure.

FIG. 7 is a flowchart showing a process for producing summary statistics of a video frame or derived stimulus according to some embodiments of the present disclosure. In step 700, per-image results are extracted from the database which stores responses from a human observer. In step 702, summary statistics are calculated using those per-image results. In step 704, records of the summary statistics attached to frames from the raw car data (not the derived stimuli) are recorded in a separate table.

Records of all of the responses by human observers on a given task for a given frame are extracted from the database in step 700. In one example, all of the responses of a given type are aggregated into a single data structure.

This data structure is queried to produce summary statistics in step 702. These summary statistics could include measurements of the central tendency of the distribution of scores like the mean, median, or mode. They could include measurements of the heterogeneity of the scores like variance, standard deviation, skew, kurtosis, heteroskedasticity, multimodality, or uniformness. They could also include summary statistics like those above calculated from the implicit measurements of the responses listed above.

The calculated summary statistics are recorded in a database table in step 704 attached to a unique identifier which links them to the video frame or sensor data frame associated with the responses from which they were calculated.

Figure 8:
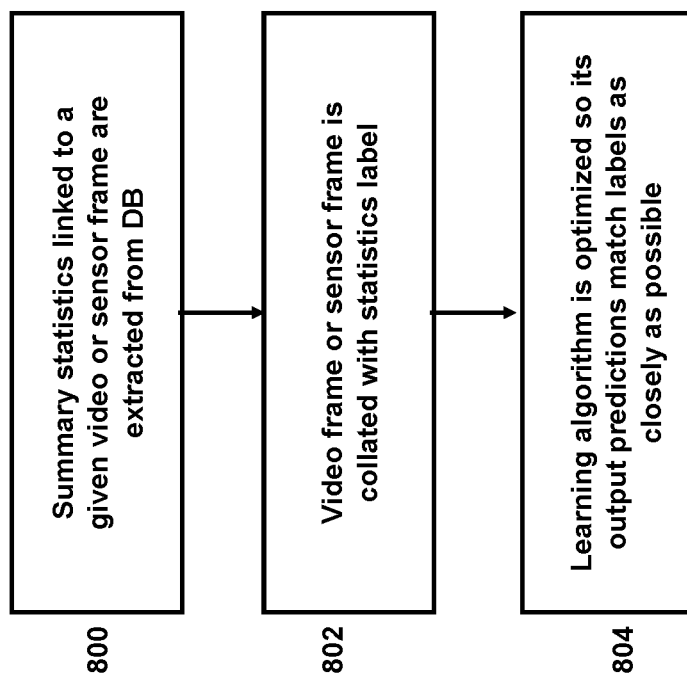
FIG. 8 is a flowchart showing a process of training a learning algorithm using summary statistics, according to some embodiments of the present disclosure.

FIG. 8 is a flowchart showing a process of training a learning algorithm using summary statistics, according to some embodiments of the present disclosure. For example, in one embodiment, the process may train an algorithm used in the model training system 112 in FIG. 1. In step 800, summary statistics linked to a given video or sensor frame are extracted from the database 110 in FIG. 1. Subsequently, in step 802, the video or sensor frame may be collated with the statistics label for the frame. The collated frame is provided to the learning algorithm in the model training system 112 in step 804, and this process yields a final learning algorithm in step 806.

In some embodiments, between one and three partitions are generated from the database records in step 800. These partitions each comprise a list of images in the set of images that have been manipulated to create derived stimuli and rated by human observers. At least one of these partitions is made to comprise a set of training data. An additional partition may be created to use as a set of validation data, a second list of images in the set of images that have been manipulated to create derived stimuli and rated by human images, but where the second validation set is not shown to the model in the learning phase, but is instead preserved to be used later for evaluation.

The list of images in the training data partition is collated with some or all of the summary statistics that have been generated from the human observer responses to those images and stored in the database in step 802, such that the summary statistics are associated with the appropriate image in the list which comprises the training partition.

Each combination of image and summary statistics comprises a single training sample for the learning algorithm in step 804. The algorithm may be any type of supervised learning algorithm capable of predicting a continuous label for a two or three dimensional input, including but not limited to a random forest regressor, a support vector regressor, a simple neural network, a deep convolutional neural network, a recurrent neural network, a long-short-term memory (LSTM) neural network with linear or nonlinear kernels that are two dimensional or three dimensional.

The learning algorithm is optimized by a process of progressively adjusting the parameters of that algorithm in response to the characteristics of the images and summary statistics given to it in the training phase to minimize the error in its predictions of the summary statistics for the training images in step 804. In one embodiment of the model training system 112, the algorithm can be a deep neural network. In this embodiment the parameters are the weights attached to the connections between the artificial neurons comprising the network. Pixel data from an image in a training set collated with human observer summary statistics in step 802 can serve as an input to the network. This input can be transformed according to a mathematical function by each of the artificial neurons, and then the transformed information can be transmitted from that artificial neuron to other artificial neurons in the neural network. The transmission between the first artificial neuron and the subsequent neurons can be modified by the weight parameters discussed above. In this embodiment, the neural network can be organized hierarchically such that the value of each input pixel can be transformed by independent layers (e.g., 10 to 20 layers) of artificial neurons, where the inputs for neurons at a given layer come from the previous layer, and all of the outputs for a neuron (and their associated weight parameters) go to the subsequent layer. At the end of the sequence of layers, in this embodiment, the network can produce numbers that are intended to match the human summary statistics given at the input. The difference between the numbers that the network output and the human summary statistics provided at the input comprises an error signal. An algorithm (e.g., back-propagation) can be used to assign a small portion of the responsibility for the error to each of the weight parameters in the network. The weight parameters can then be adjusted such that their estimated contribution to the overall error is reduced. This process can be repeated for each image (or for each combination of pixel data and human observer summary statistics) in the training set collected via step 802. At the end of this process the model is "trained", which in some embodiments, means that the difference between the summary statistics output by the neural network and the summary statistics calculated from the responses of the human observers in step 506 is minimized.

Figure 9:
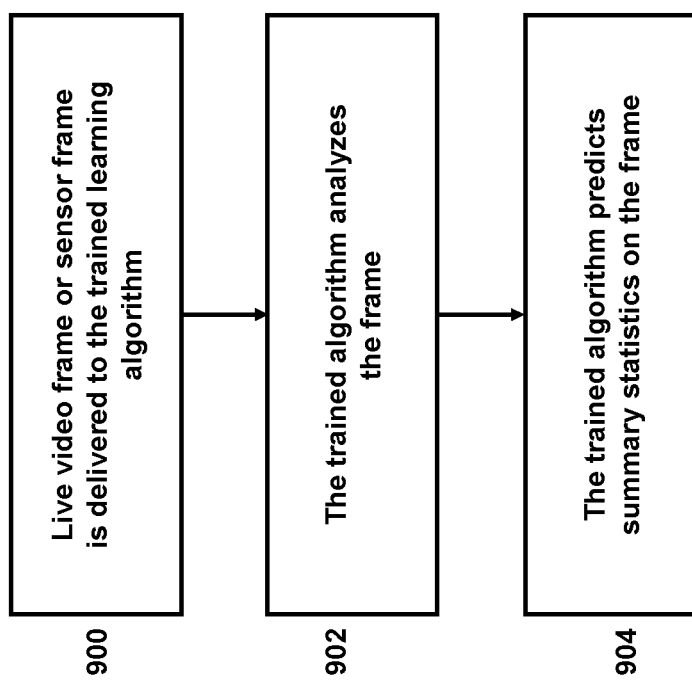
FIG. 9 is a flowchart showing a process of predicting the state of mind of road users using a trained learning algorithm, according to some embodiments of the present disclosure.

FIG. 9 is a flowchart showing a process of predicting the state of mind of road users using a trained learning algorithm, according to some embodiments of the present disclosure. In step 900, the training algorithm receives a "real world" or "live data" video or sensor frame. Then in step 902, the trained algorithm analyzes the frame, thus enabling the algorithm in step 904 to output a prediction of summary statistics on the frame.

The "real world" or "live data" video or other sensor frames from a car-mounted sensor are delivered to the trained learning algorithm in step 900. These frames have the same resolution, color depth and file format as the frames used to train the algorithm. These frames are delivered as individual frames or as sequences according to the format used to train the original algorithm.

Each of these frames is analyzed by being passed through the trained model in step 902. In one embodiment, the data from the frame that was passed through the model would comprise the pixel data from a camera. This data would be transformed by an artificial neural network that had been trained according to step 804. At the final stage of the processing in the artificial network, it would produce an output. This output is the model output in step 904.

The model outputs a number or set of numbers that comprise the predicted summary statistics for the "real world" or "live data" image in step 904. The predicted summary statistics are the model's best estimation of what the summary statistics would be on the image if the image had human annotations collected. The prediction is generated automatically by passing the sensor data through the model, where the information is transformed by the internal mechanisms of the model according to the parameters that were set in the training process shown in step 804. Because these summary statistics characterize the distribution of human responses that predict the state of mind of a road user pictured in the stimulus, the predicted statistics are therefore a prediction of the aggregate judgment of human observers of the state of mind of the pictured road user and thus an indirect prediction of the actual state of mind of the road user.

Figure 10:
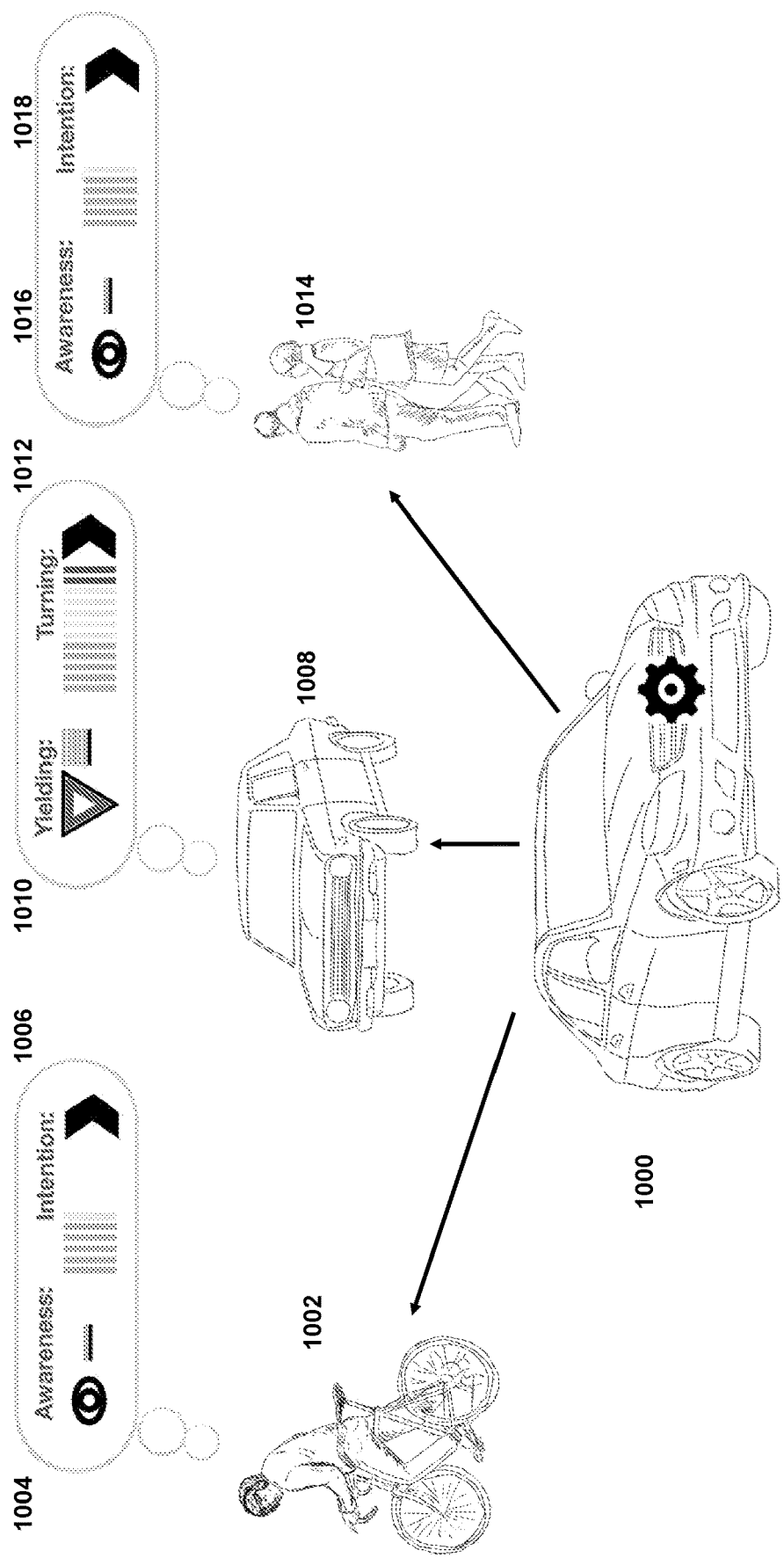
FIG. 10 is a diagram showing an example of an application of a context user prediction process in an automobile context, according to some embodiments of the present disclosure.

FIG. 10 is a diagram showing an example of an application of a context user prediction process in an automobile context, according to some embodiments of the present disclosure. In this example intention 1006 1018 means that the road user 1002 1014 has the goal of moving into the path of the vehicle 1000 before the vehicle 1000 (on which the system is mounted) reaches their position. Awareness 1004

1016 in this example means that the road user 1002 1014 understands that the vehicle on which the system is mounted 1000 is present in their vicinity. In this example, when cyclist 1002 rides into the field of view of a camera mounted on vehicle 1000, the pixel data of the camera image of the cyclist is fed to a trained algorithm as described above in step 900. The trained algorithm analyzes the image as described above in step 902. The trained algorithm would predict summary statistics as in step 904. These summary statistics are an estimate of what the summary statistics would be for a collection of human observers who were shown a derived stimulus of the camera data as in step 504. The estimates summary statistics are therefore the system's best answer to the question "does this cyclist intend to enter the path of the vehicle." The vehicle is therefore able to make a guess 1006 about the intention of the cyclist that is closely matched to the guess that a human driver would make in that same situation. In this example, the intention of the cyclist 1006 is relatively high, as indicated by the number of horizontal bars in the display. The system installed on an automobile 1000 also makes predictions about the awareness 1004 of cyclists of the vehicle 1000, by the same method described for intention. It also makes predictions about the willingness of an automobile 1008 to yield 1010 or its desire to turn across the system-containing vehicle's path 1012 by the same method described above. In the case of the automobile the questions that human subjects answered that would be predicted by the algorithm are "would the vehicle be willing to yield" 1010 and "does the vehicle wish to turn across your path" 1012. It also makes predictions about the desire of pedestrians 1014 to cross in front of the vehicle 1018, and whether those pedestrians are aware of the vehicle 1016, by the same method described above.

The models described above can be implemented as a real-time module that makes predictions of road user behavior based on input from cameras or other sensors installed on a car 1000. In the case of an autonomous car, these predictions can be used to make inferences about the intent of road users such as cyclists 1002, other motorists 1008, and pedestrians 1014 to cross into the path of the car, as well as whether the road users are aware of the car and its future path. They can also be used to predict whether other road users would be surprised, welcoming, or aggressively unwelcoming if the car were to engage in maneuvers which would take it into the path of another road user (e.g., would an oncoming car yield if the car implementing the systems and methods described herein were to turn left).

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device) or in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

We claim:

1. A computer-implemented method comprising:
   receiving, by a computing device associated with an autonomous vehicle operating on a road, sensor data captured by a sensor installed on the autonomous vehicle, the sensor data displaying an object on the road;
   providing the sensor data as input to a supervised learning based model, the supervised learning based model configured to receive an input sensor data displaying a particular object on a road and predicting an output statistical summary characterizing a distribution of user responses expected to be received responsive to presenting the sensor data to a plurality of users, the user responses associated with the particular object;
   executing the trained supervised learning based model to generate a statistical summary data characterizing a distribution of user responses expected to be received responsive to presenting the sensor data captured by the sensor installed on the autonomous vehicle to users; and
   controlling the operation of the autonomous vehicle on the road based on the generated statistical summary data.

2. The computer-implemented method of claim 1, wherein the supervised learning based model is one of:
   a random forest regressor,
   a support vector regressor,
   a simple neural network,
   a deep convolutional neural network,
   a recurrent neural network,
   or a long short-term memory (LSTM) neural network.

3. The computer-implemented method of claim 1, wherein the object on the road is one of:
   a pedestrian,
   a cyclist, or
   a motor vehicle.

4. The computer-implemented method of claim 1, wherein the user responses describe an action associated with the object, the action including one of the object staying in place, changing lanes, or crossing a street.

5. The computer-implemented method of claim 1, wherein the statistical data is associated with a parameter of the subset of the plurality of response data, the parameter including at least one of a content of a response, a time associated with entering a response, and a position of an eye of a human observer associated with the response, the position being measured with respect to a display associated with the user interface.

6. The computer-implemented method of claim 5, wherein the parameter is further associated with at least one of a central tendency, a variance, a skew, a kurtosis, a scale, and a histogram.

7. The computer-implemented method of claim 1, wherein the supervised learning based model is configured to predict user responses describing a state of mind of a road user associated with the object.

8. The computer-implemented method of claim 1, wherein the object is associated with a road user and the supervised learning based model is configured to predict user responses describing an intention of the road user to move into the path of the autonomous vehicle.

9. The computer-implemented method of claim 1, wherein the object is associated with a road user and the supervised learning based model is configured to predict user responses describing awareness of the road user of the autonomous vehicle.

10. A non-transitory computer readable storage medium storing instructions that when executed by one or more processors, cause the one or more processors to perform the steps comprising:
    receiving, by a computing device associated with an autonomous vehicle operating on a road, sensor data captured by a sensor installed on the autonomous vehicle, the sensor data displaying an object on the road;
    providing the sensor data as input to a supervised learning based model, the supervised learning based model configured to receive an input sensor data displaying a particular object on a road and predicting an output statistical summary characterizing a distribution of user responses expected to be received responsive to presenting the sensor data to a plurality of users, the user responses associated with the particular object;
    executing the trained supervised learning based model to generate a statistical summary data characterizing a distribution of user responses expected to be received responsive to presenting the sensor data captured by the sensor installed on the autonomous vehicle to users; and
    controlling the operation of the autonomous vehicle on the road based on the generated statistical summary data.

11. The non-transitory computer readable storage medium of claim 10, wherein the supervised learning based model is one of:
    a random forest regressor,
    a support vector regressor,
    a simple neural network,
    a deep convolutional neural network,
    a recurrent neural network,
    or a long short-term memory (LSTM) neural network.

12. The non-transitory computer readable storage medium of claim 10, wherein the object on the road is one of:
    a pedestrian,
    a cyclist, or
    a motor vehicle.

13. The non-transitory computer readable storage medium of claim 10, wherein the user responses describe an action associated with the object, the action including one of the object staying in place, changing lanes, or crossing a street.

14. The non-transitory computer readable storage medium of claim 10, wherein the statistical data is associated with a parameter of the subset of the plurality of response data, the parameter including at least one of a content of a response, a time associated with entering a response, and a position of an eye of a human observer associated with the response, the position being measured with respect to a display associated with the user interface.

15. The non-transitory computer readable storage medium of claim 14, wherein the parameter is further associated with at least one of a central tendency, a variance, a skew, a kurtosis, a scale, and a histogram.

16. The non-transitory computer readable storage medium of claim 10, wherein the supervised learning based model is configured to predict user responses describing a state of mind of a road user associated with the object.

17. The non-transitory computer readable storage medium of claim 10, wherein the object is associated with a road user and the supervised learning based model is configured to predict user responses describing an intention of the road user to move into the path of the autonomous vehicle.

18. The non-transitory computer readable storage medium of claim 10, wherein the object is associated with a road user and the supervised learning based model is configured to predict user responses describing awareness of the road user of the autonomous vehicle.

19. A computing system comprising:
one or more processors; and
a non-transitory computer readable storage medium, storing instructions that when executed by the one or more processors, cause the one or more processors to perform steps comprising:
receiving, by a computing device associated with an autonomous vehicle operating on a road, sensor data captured by a sensor installed on the autonomous vehicle, the sensor data displaying an object on the road;
providing the sensor data as input to a supervised learning based model, the supervised learning based model configured to receive an input sensor data displaying a particular object on a road and predicting an output statistical summary characterizing a distribution of user responses expected to be received responsive to presenting the sensor data to a plurality of users, the user responses associated with the particular object;
executing the trained supervised learning based model to generate a statistical summary data characterizing a distribution of user responses expected to be received responsive to presenting the sensor data captured by the sensor installed on the autonomous vehicle to users; and
controlling the operation of the autonomous vehicle on the road based on the generated statistical summary data.

20. The computing system of claim 19, wherein the supervised learning based model is configured to predict user responses describing a state of mind of a road user associated with the object.

21. The computing system of claim 19, wherein the object is associated with a road user and the supervised learning based model is configured to predict user responses describing an intention of the road user to move into the path of the autonomous vehicle.

22. The computing system of claim 19, wherein the object is associated with a road user and the supervised learning based model is configured to predict user responses describing awareness of the road user of the autonomous vehicle.

* * * * *